United States Patent [19]

Inoue et al.

[11] 4,444,013
[45] Apr. 24, 1984

[54] SUPERCHARGER FOR MOTORCYCLE ENGINE

[75] Inventors: Kazuo Inoue, Tokyo; Masatoshi Suzuki, Saitama, both of Japan; Ryo Narisawa, Quebec, Canada

[73] Assignee: Honda Giken Kogyo Kabushiki Kaisha, Tokyo, Japan

[21] Appl. No.: 301,638

[22] Filed: Sep. 14, 1981

[30] Foreign Application Priority Data

Sep. 17, 1980 [JP] Japan ................................ 55-128008

[51] Int. Cl.³ .............................................. F02B 37/00
[52] U.S. Cl. .................................... 60/605; 123/52 M
[58] Field of Search ................. 60/597, 598, 605, 611; 123/52 M

[56] References Cited

U.S. PATENT DOCUMENTS 3,464,202  9/1969  Wagner ................................. 60/611
3,568,435  3/1971  May ..................................... 60/611 X
3,680,305  8/1972  Miller ................................. 123/65 X
3,796,048  3/1974  Annus et al. ........................ 123/52 M Primary Examiner—Michael Koczo
Assistant Examiner—Peggy A. Neils
Attorney, Agent, or Firm—Lyon & Lyon

[57] ABSTRACT

An internal combustion engine has a compressor in its intake passage and an exhaust turbine driven by exhaust gases, the turbine driving the compressor. A charge pipe downstream from the compressor charges a plenum chamber and the output from the plenum chamber passes through an intake pipe equipped with a throttle valve. The cross section area of the charge pipe is less than that of the maximum opening through the throttle valve. A branch pipe connects the charge pipe to a resonance chamber and the cross section area of the branch pipe is equal to or greater than the restricted cross section area of the charge pipe, with the result that surging of the compressor is minimized.

4 Claims, 2 Drawing Figures

SUPERCHARGER FOR MOTORCYCLE ENGINE

This invention relates to a supercharger system for the engine of a motorcycle.

It is known to equip a motorcycle engine with a supercharger having an exhaust turbine in an exhaust passage driving a compressor in an intake passage. However, according to the suction of the engine, pulsations are established at the outlet portion of said compressor and this results in a disadvantage that surging of the compressor is likely to take place.

Accordingly, an important object of the present invention is to provide a supercharger free from such disadvantage. This is accomplished by restricting the effective cross section area of the charge pipe downstream from the compressor so that the cross section area is less than the maximum opening through a throttle valve in the intake passage downstream from the charge pipe.

Other and more detailed objects and advantages will appear hereinafter.

Figure 1:
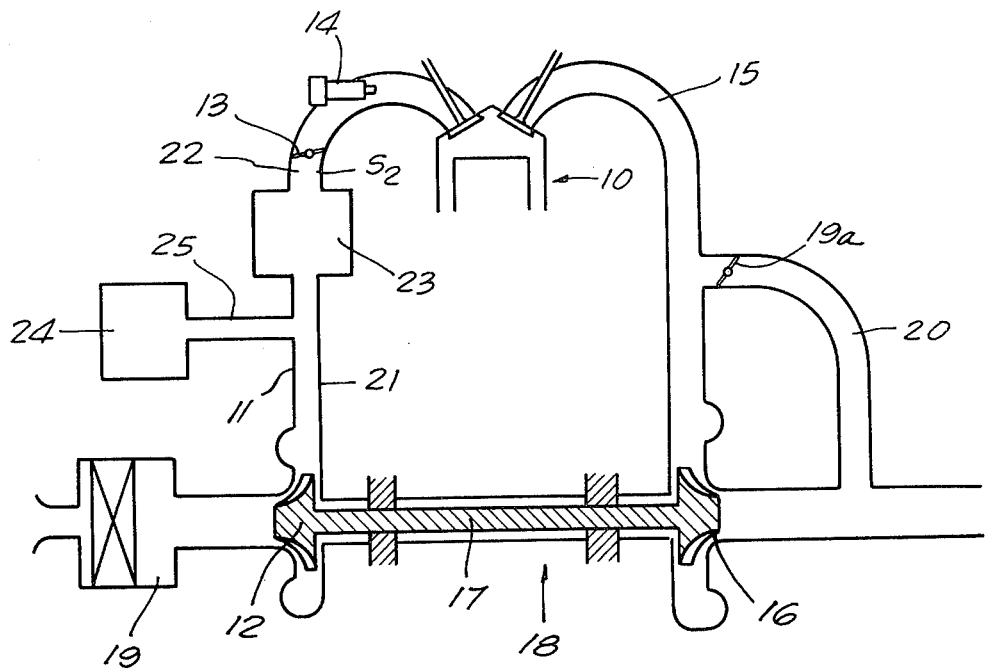
FIG. 1 is a diagrammatic layout showing a preferred embodiment of this invention.

Referring to the drawings, the engine generally designated 10 is provided with an intake passage 11 having a compressor 12, a throttle valve 13 and a fuel injection nozzle 14 mounted therein. The engine 10 is also provided with an exhaust passage 15 containing an exhaust turbine 16 which drives the compressor 12 through the shaft 17. The exhaust turbine 16, compressor 12 and connecting shaft 17 constitute a supercharger generally designated 18. Air from the air cleaner 19 passes through the compressor 12 and through the intake passage 11, throttle valve 13, fuel injection nozzle 14 into the engine 10. Exhaust gases from the engine pass through the exhaust passage 15 and a portion of the exhaust gases drive the exhaust turbine 16. Another portion of the exhaust gases pass through the waste gate valve 19a and bypass passage 20.

The charge pipe 21 downstream from the compressor 12 has a smaller effective area than the maximum opening in the throttle valve 13 within the intake pipe 22. This relatively small effective area of the charge pipe 21 effectively reduces pulsations from the compressor 12 and is effective to prevent surging of said compressor. At the same time the relatively small effective area introduces a relatively high discharge pressure from said compressor 12 and admits a relatively high air flow rate so that it efficiently corresponds to the maximum opening of the throttle valve 13 while being freed from any special reduction in the power input.

Moreover, a plenum chamber 23 is interposed between the two pipes 21 and 22 to absorb any aforementioned pulsations. In addition, the charge pipe 21 is equipped with a resonance chamber 24 through a branch pipe 25 so as to absorb a predetermined frequency, i.e., a frequency of an R.P.M. range in which the problem of surging is encountered. The effective area of the branch pipe 25 is equal to or greater than the effective area of the charge pipe 21. The effective area of the charge pipe 21 is less than the maximum opening through the throttle valve 13.

Figure 2:
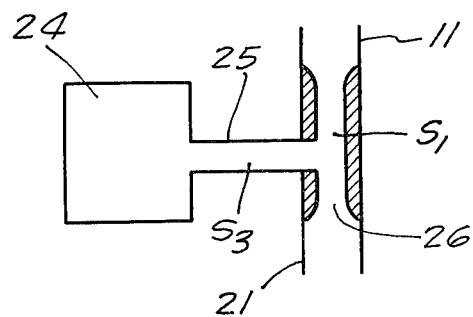
FIG. 2 shows a portion of FIG. 1 and illustrating a modification.

In the modified form of the invention shown in FIG. 2, the charge pipe 21 has a restriction 26 with a relatively small cross section area of $S_1$. The branch pipe 25 leading to the resonance chamber 24 has an effective area $S_3$ which is equal to or greater than the area $S_1$. Also, the area $S_1$ is less than the maximum effective opening $S_2$ through the throttle valve 13.

As described above, and in accordance with the present invention, the charge pipe 21 in the intake passage 11 has a restricted cross section area such that its minimum effective area $S_1$ is smaller than the maximum effective opening area $S_2$ of the throttle valve 13. This small effective area serves to block as much as possible influences on the compressor 12 due to suction characteristics of the engine, thereby minimizing surging of the compressor 12. Moreover, that small effective area $S_1$ causes a relatively high discharge pressure from said compressor 12. A relatively high air flow rate is produced which efficiently corresponds to the maximum opening $S_2$ of the throttle valve 13 while being freed from any power reduction.

Having fully described our invention, it is to be understood that we are not to be limited to the details herein set forth but that our invention is of the full scope of the appended claims.

We claim:

1. In an internal combustion engine having a supercharger comprising a compressor in an intake passage and an exhaust turbine in an exhaust passage, the improvement comprising, in combination: a charge pipe leading from the compressor and comprising a portion of said intake passage, a throttle valve in said intake passage, the minimum effective area of said charge pipe being smaller than the maximum effective opening area of said throttle valve, a resonance chamber and a branch pipe, said resonance chamber being connected to said charge pipe through said branch pipe, the portion of the charge pipe from which the branch pipe extends having an effective area smaller than the maximum effective opening area of said throttle valve.

2. The combination set forth in claim 1 in which a plenum chamber is interposed between said charge pipe and said throttle valve.

3. The combination set forth in claim 1 in which the effective area of said branch pipe is equal to or larger than the effective area of said charge pipe at the location of said branch pipe.

4. The combination set forth in claim 1 in which the charge pipe contains a restriction which defines the minimum effective area of said charge pipe.

* * * * *